United States Patent
Stahl et al.

(10) Patent No.: US 8,955,096 B1
(45) Date of Patent: Feb. 10, 2015

(54) SYSTEMS AND METHODS FOR FILTERING INTERNET ACCESS

(75) Inventors: George Stahl, Santa Monica, CA (US); Shaun Cooley, El Segundo, CA (US)

(73) Assignee: Symantec Corporation, Mountain View, CA (US)

( * ) Notice: Subject to any disclaimer, the term of this patent is extended or adjusted under 35 U.S.C. 154(b) by 924 days.

(21) Appl. No.: 12/754,882

(22) Filed: Apr. 6, 2010

(51) Int. Cl.
*H04L 29/06* (2006.01)

(52) U.S. Cl.
CPC ........ *H04L 63/0227* (2013.01); *H04L 63/0236* (2013.01)
USPC .................................................. 726/14; 726/1

(58) Field of Classification Search
None
See application file for complete search history.

(56) References Cited

U.S. PATENT DOCUMENTS

| | | | |
|---|---|---|---|
| 7,647,425 B2* | 1/2010 | Charzinski et al. | 709/239 |
| 7,720,998 B2* | 5/2010 | Foote et al. | 709/245 |
| 7,926,108 B2* | 4/2011 | Rand et al. | 726/22 |
| 8,650,245 B1* | 2/2014 | Ashley | 709/203 |
| 2002/0178238 A1* | 11/2002 | Fletcher et al. | 709/220 |
| 2007/0211714 A1* | 9/2007 | Metke et al. | 370/389 |
| 2008/0184357 A1* | 7/2008 | Drako et al. | 726/11 |
| 2009/0055929 A1* | 2/2009 | Lee et al. | 726/23 |
| 2010/0100957 A1* | 4/2010 | Graham et al. | 726/22 |
| 2011/0035469 A1* | 2/2011 | Smith et al. | 709/220 |

* cited by examiner

*Primary Examiner* — Benjamin Lanier
(74) *Attorney, Agent, or Firm* — ALG Intellectual Property, LLC

(57) ABSTRACT

A computer-implemented method for filtering Internet access may include: 1) identifying a domain-name-system request from a client system, 2) identifying a filtering policy for the client system, 3) bundling the filtering policy with the domain-name-system request, and then 4) forwarding the bundled domain-name-system request to a domain-name-system server. Various other methods and systems are also disclosed.

20 Claims, 6 Drawing Sheets

SYSTEMS AND METHODS FOR FILTERING INTERNET ACCESS

BACKGROUND

Organizations face an ever-increasing number of distracting and harmful intrusions as their members use and navigate the Internet. Malicious, inappropriate, and/or irrelevant websites may consume precious network bandwidth and resources, serve to propagate malware within an organization, decrease productivity, and/or degrade an organization's work environment.

Traditional Internet-filtering systems may spare an organization from many of these problems by filtering access to unwanted Internet sites that would otherwise be available to an endpoint within the organization. For example, an IT administrator may install and configure filtering software on each client system within an organization in order to prevent members of the organization from accessing unwanted Internet sites. Unfortunately, installing, configuring, and maintaining filtering software on each client system within the organization may prove cumbersome, complex, and expensive. In addition, while some traditional Internet-filtering systems may utilize filtering software installed on a gateway, this solution may grow in expense as the number of client systems within an organization increases. Accordingly, the instant disclosure identifies a need for simple and cost-effective systems and methods for filtering Internet access.

SUMMARY

As will be described in greater detail below, the instant disclosure generally relates to systems and methods for filtering Internet access. In one example, one or more of the various systems described herein may accomplish this task by: 1) identifying a domain-name-system request from a client system, 2) identifying a filtering policy for the client system, 3) bundling the filtering policy with the domain-name-system request, and then 4) forwarding the bundled domain-name-system request to a domain-name-system server.

Identifying the domain-name-system request from the client system may occur in a variety of contexts. In some examples, the various systems described herein may identify the domain-name-system request when intercepting the domain-name-system-request with an intercepting appliance (e.g., a router). Additionally or alternatively, the various systems described herein may intercept the domain-name-system request using a filter driver on the client system.

In some examples, the filtering policy may include one or more categories of Internet resources to filter, such as a content-based category. The filtering policy may also include a policy to block access to one or more Internet resources.

In another example, one or more of the various systems described herein may filter Internet access by: 1) receiving a domain-name-system request from a client system, 2) identifying a filtering policy that is bundled with the domain-name-system request, 3) identifying a domain of the domain-name-system request, 4) determining that the filtering policy applies to the domain, and then 5) filtering access to the domain based on the determination. In some examples, identifying the filtering policy may include: 1) looking up stored filtering rules that apply to the client system and then 2) including the stored filtering rules in the filtering policy.

In one example, filtering access to the domain may include returning an error message to the client system. In this example, the error message may include a message indicating that the domain does not exist. In other examples, filtering access to the domain may include redirecting the client system to a predetermined web resource.

As will be explained below, by bundling filtering policies with domain-name-system requests, the systems and methods described herein may effectively filter Internet access. For example, by using a domain name server to apply various filtering policies, the systems and methods described herein may filter Internet access while minimizing the amount of necessary configuration to client systems and/or reducing outlays necessary for specialized equipment.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
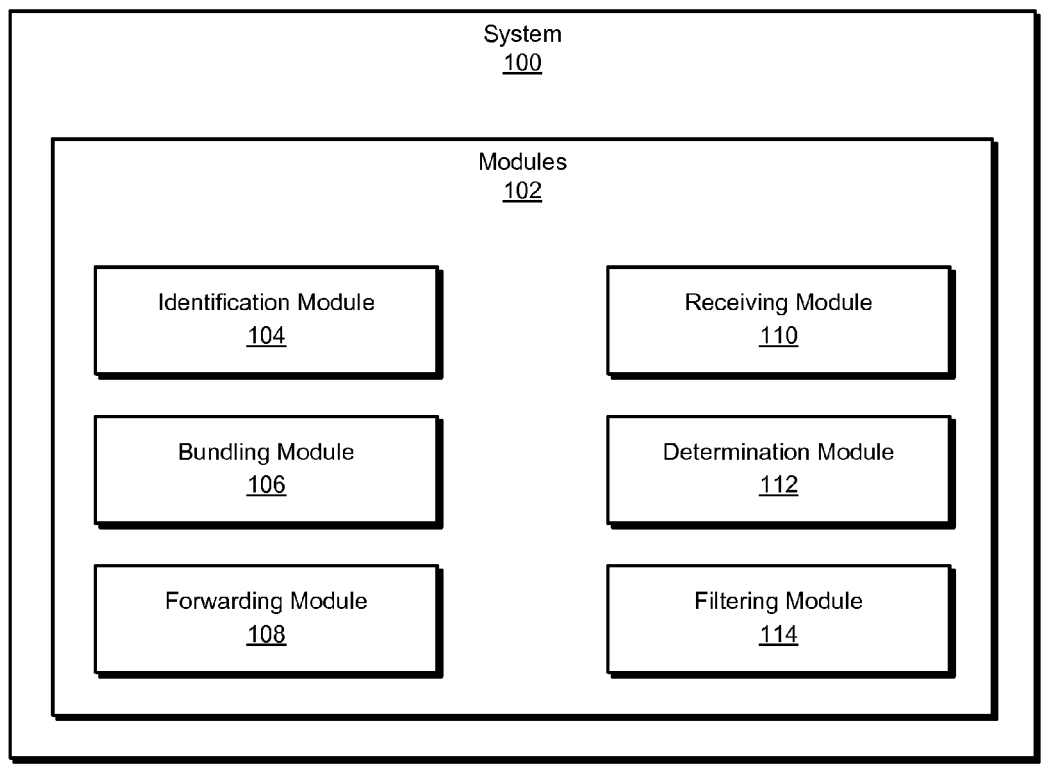
FIG. 1 is a block diagram of an exemplary system for filtering Internet access.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

As will be described in greater detail below, the instant disclosure generally relates to systems and methods for filtering Internet access. In one example, the various systems described herein may accomplish this task by: 1) identifying a domain-name-system request from a client system, 2) identifying a filtering policy for the client system, 3) bundling the filtering policy with the domain-name-system request, and then 4) forwarding the bundled domain-name-system request to a domain-name-system server. In another example, the various systems described herein may accomplish this task by: 1) receiving a domain-name-system request from a client system, 2) identifying a filtering policy that is bundled with the domain-name-system request, 3) identifying a domain of the domain-name-system request, 4) determining that the filtering policy applies to the domain, and then 5) filtering access to the domain based on the determination.

Figure 2:
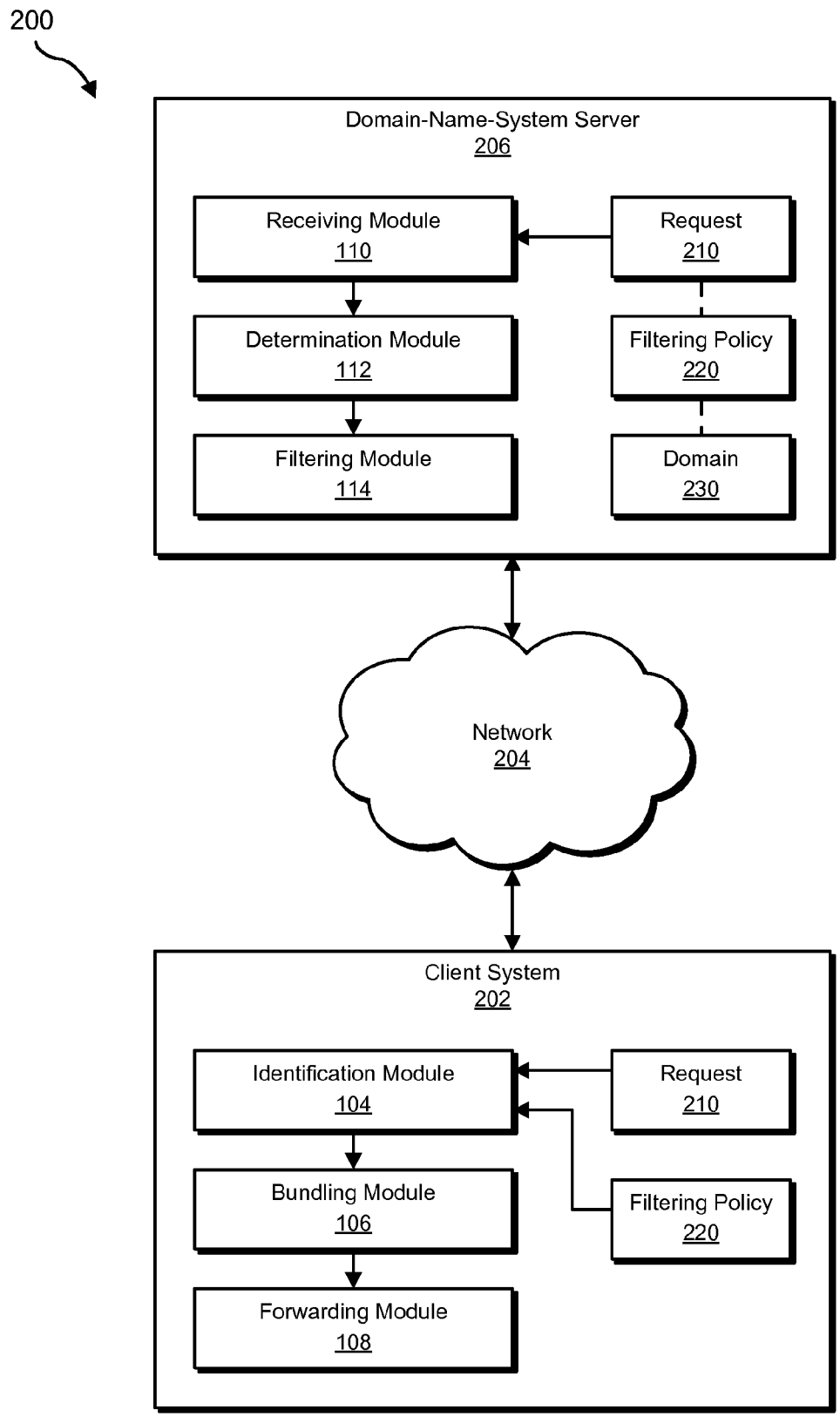
FIG. 2 is a block diagram of an exemplary system for filtering Internet access.

The following will provide, with reference to FIGS. 1-2, detailed descriptions of exemplary systems for filtering Internet access. Detailed descriptions of corresponding computer-implemented methods will also be provided in connection with FIGS. 3-4. In addition, detailed descriptions of an exemplary computing system and network architecture capable of implementing one or more of the embodiments described herein will be provided in connection with FIGS. 5 and 6, respectively.

FIG. 1 is a block diagram of an exemplary system 100 for filtering Internet access. As illustrated in this figure, exemplary system 100 may include one or more modules 102 for performing one or more tasks. For example, and as will be explained in greater detail below, exemplary system 100 may include an identification module 104 programmed to: 1) identify a domain-name-system request from a client system and 2) identify a filtering policy for the client system. Exemplary system 100 may also include a bundling module 106 programmed to bundle the filtering policy with the domain-name-system request. Exemplary system 100 may further include a forwarding module 108 programmed to forward the bundled domain-name-system request to a domain-name-system server.

In addition, and as will be described in greater detail below, exemplary system 100 may include a receiving module 110 programmed to: 1) receive a domain-name-system request from a client system, 2) identify a filtering policy that is bundled with the domain-name-system request, and 3) identify a domain of the domain-name-system request. Exemplary system 100 may also include a determination module 112 programmed to determine that the filtering policy applies to the domain. Exemplary system 100 may additionally include a filtering module 114 programmed to filter access to the domain based on the determination. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, as will be described in greater detail below, one or more of modules 102 may represent software modules stored and configured to run on one or more computing devices, such as the devices illustrated in FIG. 2 (e.g., client system 202 and/or domain-name-system server 206), computing system 510 in FIG. 5, and/or portions of exemplary network architecture 600 in FIG. 6. One or more of modules 102 in FIG. 1 may also represent all or portions of one or more special-purpose computers configured to perform one or more tasks.

Exemplary system 100 in FIG. 1 may be deployed in a variety of ways. For example, all or a portion of exemplary system 100 may represent portions of a cloud-computing or network-based environment, such as exemplary system 200 illustrated in FIG. 2. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

As shown in FIG. 2, system 200 may include a client system 202 in communication with a domain-name-system server 206 via a network 204. In one embodiment, and as will be described in greater detail below, modules 102 from FIG. 1 may cause client system 202 to: 1) identify a domain-name-system request (such as a request 210) from a client system, 2) identify a filtering policy (such as a filtering policy 220) for the client system, 3) bundle the filtering policy with the domain-name-system request, and then 4) forward the bundled domain-name-system request to a domain-name-system server (such as domain-name-system server 206).

In another embodiment, the modules 102 from FIG. 1 may cause domain-name-system server 206 to: 1) receive a domain-name-system request (such as request 210) from a client system (such as client system 202), 2) identify a filtering policy (such as filtering policy 220) that is bundled with the domain-name-system request, 3) identify a domain of the domain-name-system request (such as domain 230), 4) determine that the filtering policy applies to the domain, and then 5) filter access to the domain based on the determination.

Client system 202 generally represents any type or form of computing device capable of reading computer-executable instructions. Examples of client system 202 include, without limitation, laptops, desktops, servers, cellular phones, personal digital assistants (PDAs), multimedia players, embedded systems, combinations of one or more of the same, exemplary computing system 510 in FIG. 5, or any other suitable computing device.

Domain-name-system server 206 generally represents any type or form of computing device that is capable of handling domain name system requests (e.g., resolving hostnames to IP addresses). Examples of server 206 include, without limitation, application servers and caching domain-name-system servers.

Network 204 generally represents any medium or architecture capable of facilitating communication or data transfer. Examples of network 204 include, without limitation, an intranet, a wide area network (WAN), a local area network (LAN), a personal area network (PAN), the Internet, power line communications (PLC), a cellular network (e.g., a GSM Network), exemplary network architecture 600 in FIG. 6, or the like. Network 204 may facilitate communication or data transfer using wireless or wired connections. In one embodiment, network 204 may facilitate communication between client system 202 and domain-name-system server 206.

Figure 3:
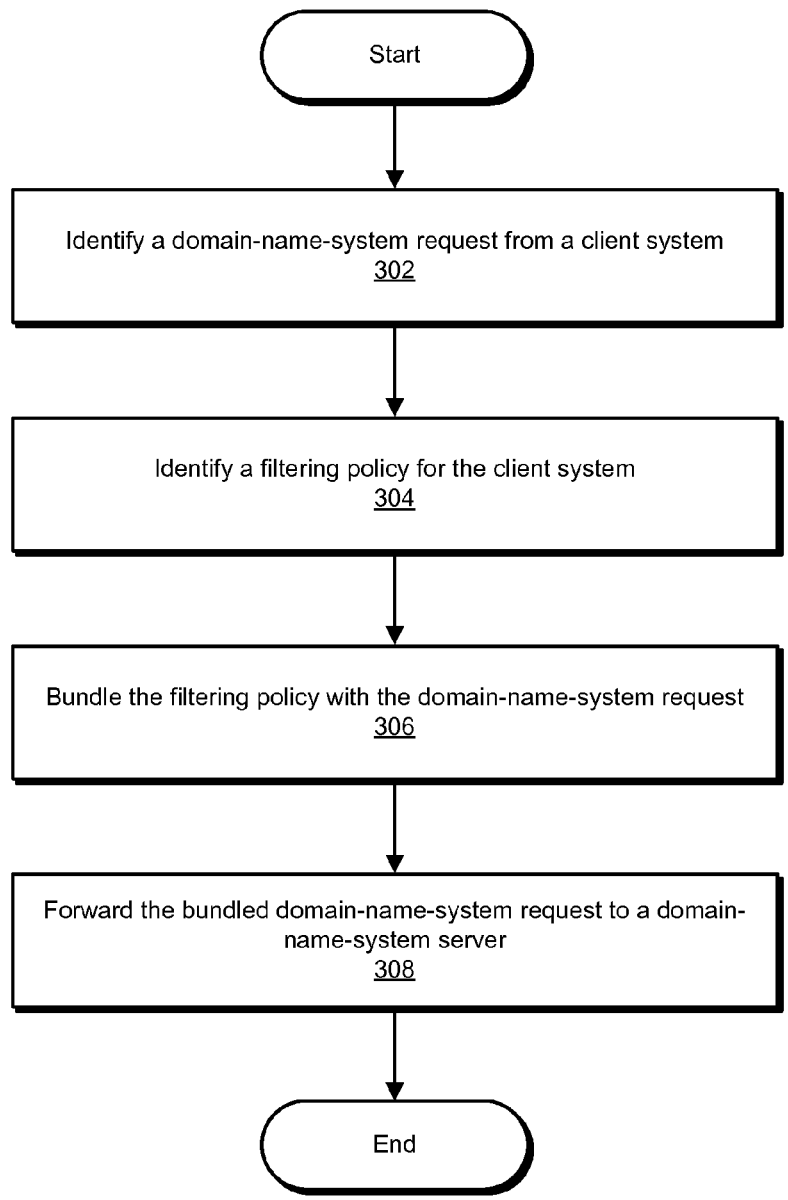
FIG. 3 is a flow diagram of an exemplary method for filtering Internet access.

FIG. 3 is a flow diagram of an exemplary computer-implemented method 300 for filtering Internet access. The steps shown in FIG. 3 may be performed by any suitable computer-executable code and/or computing system. In some embodiments, the steps shown in FIG. 3 may be performed by one or more of the components of system 100 in FIG. 1 and/or system 200 in FIG. 2.

As illustrated in FIG. 3, at step 302 one or more of the systems described herein may identify a domain-name-system request from a client system. For example, at step 302 identification module 104 may, as part of client system 202 in FIG. 2, identify request 210 from client system 202. As used herein, the term "domain-name-system request" may refer to any request and/or query to a domain-name-system server. For example, a domain-name-system request may include a request to resolve a domain name to an IP address.

Identification module 104 may identify the domain-name-system request in a variety of contexts. For example, identification module 104 may intercept the domain-name-system request with a filter driver on the client system. For example, identification module 104 may include and/or communicate with at least a portion of a network filter driver configured to intercept domain-name-system requests (e.g., by intercepting requests to an address of a domain-name-system server, by parsing traffic to find patterns present in domain-name-system requests, etc.).

Additionally or alternatively, identification module 104 may intercept the domain-name-system request with an intercepting appliance. For example, instead of or in addition to residing on the client system, identification module 104 may reside on a separate appliance through which all domain-name-system requests in a network pass. For example, the intercepting appliance may include a router.

At step 304, one or more of the systems described herein may identify a filtering policy for the client system. For example, at step 304 identification module 104 may, as part of client system 202 in FIG. 2, identify filtering policy 220 for client system 202.

Identification module 104 may perform step 304 in any suitable manner. For example, identification module 104 may identify the filtering policy by reading the filtering policy from a configuration file. Additionally or alternatively, identification module 104 may identify the filtering policy by querying a database that stores the filtering policy.

The filtering policy may include any of a variety of policies and/or rules for filtering access to network resources and/or domains. In some examples, the filtering policy may include one or more categories of Internet resources to filter. For example, the filtering policy may include a policy to filter Internet resources categorized as untrusted by a certain agency (e.g., a computing security vendor). In some examples, the category of Internet resources to filter may include a content-based category. For example, the content-based category may include "adult/pornography," "jobs/employment," "personal/social networking," etc. As will be described in greater detail below, a domain-name-system server may be configured to associate categories with domains. The domain-name-system server may accordingly respond to a domain-name-system request bundled with a category by filtering access to the domain in the request if the domain matches the category.

In some examples, the filtering policy may include a policy to block access to one or more Internet resources. For example, the filtering policy may include a list of categories of Internet resources. Simply by including a category in the list of categories, the filtering policy may indicate a policy to block access to any domain falling within the category.

Returning to FIG. 3, at step 306 one or more of the systems described herein may bundle the filtering policy with the domain-name-system request. For example, at step 306 bundling module 106 may, as part of client system 202 in FIG. 2, bundle filtering policy 220 with request 210.

Bundling module 106 may perform step 306 in any suitable manner. For example, bundling module 106 may append the filtering policy to the domain-name-system request and/or prefix the filtering policy to the domain-name-system request. Additionally or alternatively, bundling module 106 may add the filtering policy to a field of the domain-name-system request. For example, bundling module 106 may add a delimiter to the end of a hostname in a domain-name-system request and add data after the delimiter representing the filtering policy (e.g., each bit in a bit string may represent a different category in the policy).

At step 308, one or more of the systems described herein may forward the bundled domain-name-system request to a domain-name-system server. For example, at step 308 forwarding module 108 may, as part of client system 202 in FIG. 2, forward request 210 (bundled with filtering policy 220) to domain-name-system server 206.

Forwarding module 108 may perform step 308 in any suitable manner. For example, forwarding module 108 may forward the bundled domain-name-system request to the domain-name-system server by identifying the original destination of the domain-name-system request and transmitting the domain-name-system request to the original destination.

In some examples, forwarding module 108 may be configured to always forward domain-name-system requests to the domain-name-system server and/or one of a group of predetermined domain-name-system servers (e.g., domain-name-system servers configured to filter Internet access based on policies bundled with a domain-name-system request). Additionally or alternatively, all client systems may be configured to route domain-name-system requests to the domain-name-system server and/or one of a group of predetermined domain-name-system servers. In this manner, all attempts to access a domain within an organization may be subject to filtering by a domain-name-system server. Upon completion of step 308, exemplary method 300 in FIG. 3 may terminate.

Figure 4:
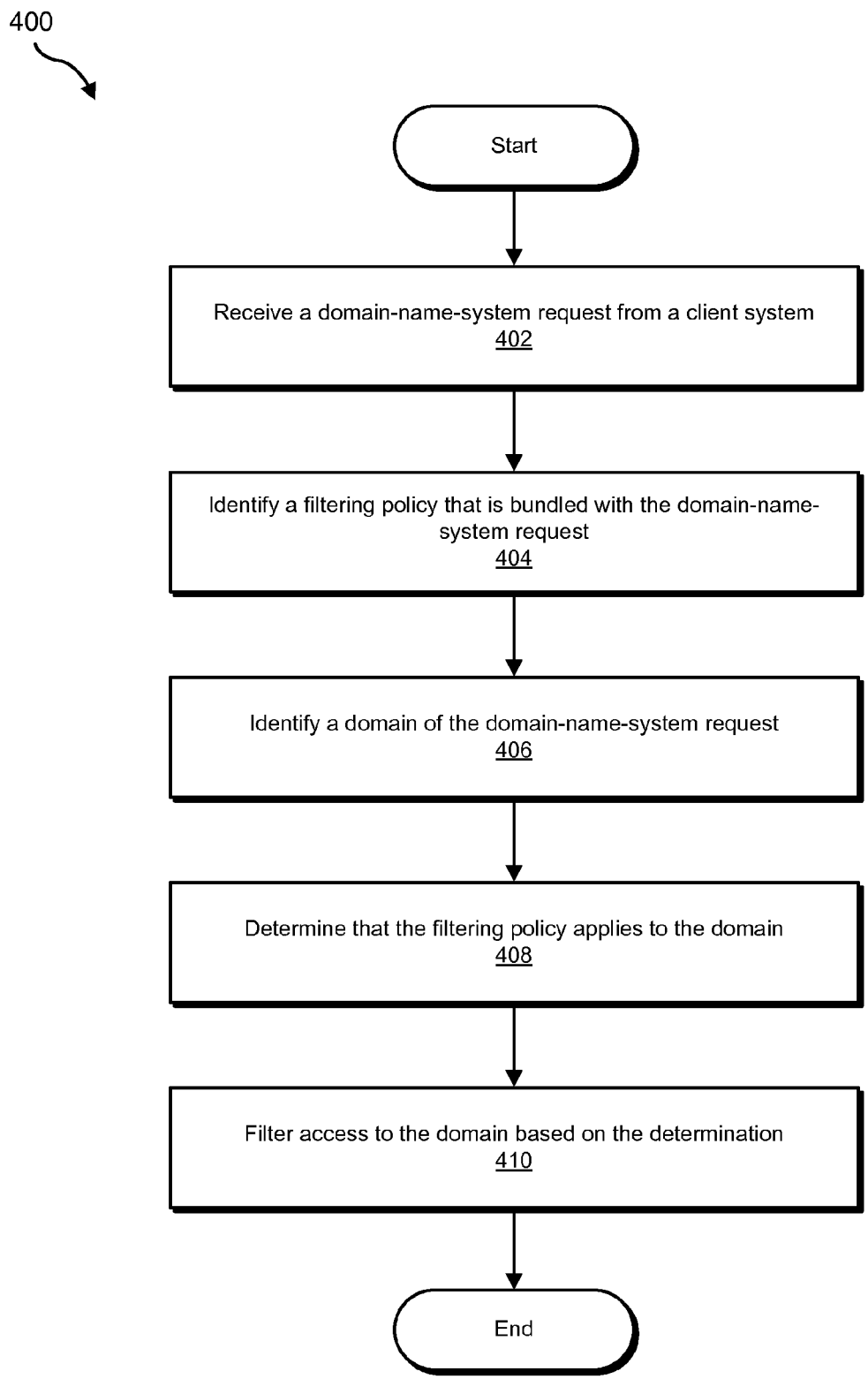
FIG. 4 is a flow diagram of an exemplary method for filtering Internet access.

FIG. 4 is a flow diagram of an exemplary computer-implemented method 400 for filtering Internet access. The steps shown in FIG. 4 may be performed by any suitable computer-executable code and/or computing system. In some embodiments, the steps shown in FIG. 4 may be performed by one or more of the components of system 100 in FIG. 1 and/or system 200 in FIG. 2.

As illustrated in FIG. 4, at step 402 one or more of the systems described herein may receive a domain-name-system request from a client system. For example, at step 402 receiving module 110 may, as part of domain-name-system server 206 in FIG. 2, receive request 210 from client system 202.

Receiving module 110 may perform step 402 in any suitable manner. For example, receiving module 110 may receive the domain-name-system request across a network connecting to the client system. In some examples, receiving module 110 may include at least a portion of a filter driver configured to intercept domain-name-system requests. Additionally or alternatively, receiving module 110 may receive the domain-name-system request by receiving a message from domain-name-system server software that received the domain-name-system request from the client system.

At step 404, one or more of the systems described herein may identify a filtering policy that is bundled with the domain-name-system request. For example, at step 404 receiving module 110 may, as part of domain-name-system server 206 in FIG. 2, identify filtering policy 220 bundled with request 210.

Receiving module 110 may perform step 404 in any suitable manner. For example, receiving module 110 may identify the filtering policy bundled with the domain-name-system request by parsing the domain-name-system request for the filtering policy. For example, if the filtering policy is appended to the domain-name-system request, receiving module 110 may read the filtering policy after reaching the end of the structure of the domain-name-system request. Additionally, receiving module 110 may parse the domain-name-system request for the filtering policy in accordance with any of the examples for bundling the filtering policy with the domain-name-system request described earlier with reference to method 300 in FIG. 3.

In some examples, as part of identifying the filtering policy, receiving module 110 may look up stored filtering rules that apply to the client system and include the stored filtering rules in the filtering policy. For example, domain-name-server 206 of FIG. 2 may expose a client configuration portal. An administrator may configure filtering rules for client system 202 via the client configuration portal. When receiving module 110 identifies the filtering policy received from client system 202, receiving module 110 may add the filtering rules to the filtering policy (e.g., if the filtering policy comprises a list of categories to filter, receiving module 110 may add categories identified in the filtering rules to the list of categories). As such, filtering policies may originate from both a domain-name-system request from a client and from a locally stored configuration of policies for the client.

Returning to FIG. 4, at step 406 one or more of the systems described herein may identify a domain of the domain-name-system request. For example, at step 406 receiving module 110 may, as part of domain-name-system server 206 in FIG. 2, identify domain 230 of request 210. As used herein, the term "domain" may refer to any domain and/or hostname that may be sent as part of a request and/or query to a domain-name-system server.

Receiving module 110 may perform step 406 in any suitable manner. For example, receiving module 110 may identify the domain of the domain-name-system request by parsing the domain-name-system request for the domain. For example, receiving module 110 may identify the domain as "www.google.com", "www.playboy.com", etc.

At step 408, one or more of the systems described herein may determine that the filtering policy applies to the domain. For example, at step 408 determination module 112 may, as part of domain-name-system server 206 in FIG. 2, determine that filtering policy 220 applies to domain 230.

Determination module 112 may perform step 408 in a variety of ways. For example, determination module 112 may query a database with the domain (and/or an IP address corresponding to the domain) and determine that the results of the query match the criteria of the filtering policy. For example, the filtering policy may specify "adult/pornography" as a category of sites to filter and the domain may correspond to "www.playboy.com." In this example, determination module 112 may query a database with "www.playboy.com" and receive "adult/pornography" as a result to the query. Determination module 112 may accordingly determine that the filtering policy applies to the domain.

In some examples, determination module 112 may determine that the filtering policy applies to the domain by querying a third party system with the domain. For example, a third party system may accept domains as input and return a category, rating, and/or classification. Determination module 112 may then compare the results of the query with the filtering policy to determine if the filtering policy corresponds to the domain.

Additionally or alternatively, an authoritative name server may return a data-name-system record (such as a text record) for the domain containing information relevant to the filtering policy. For example, an authoritative name server may respond to a query about "www.playboy.com" with "adult/pornography" in a text record. Determination module 112 may then determine that a filtering policy for sites categorized as "adult/pornography" applies to "www.playboy.com".

At step 410, one or more of the systems described herein may filter access to the domain based on the determination. For example, at step 410 filtering module 114 may, as part of domain-name-system server 206 in FIG. 2, filter access to domain 230 (e.g., filtering the access of client system 202 to domain 230).

Filtering module 114 may perform step 410 in a variety of ways. For example, filtering module 114 may filter access to the domain by returning an error message to the client system (e.g., as a response to the domain-name-system request sent by the client system). The error message may include any suitable message. In some examples, the error message may include a message that indicates that the domain does not exist (e.g., a "NON-EXISTENT DOMAIN" error). In these examples, the error message may stand in for a response that resolves the domain (e.g., to an IP address), thereby preventing the client system from accessing the site normally indicated by the domain.

In some examples, filtering module 114 may filter access to the domain by redirecting the client system to a predetermined web resource. For example, filtering module 114 may generate a response to the client system as if the domain had been resolved to a corresponding IP address, but which substitutes the correct IP address for another IP address. For example, if "www.playboy.com" normally resolves to "216.163.137.68," filtering module 114 may respond to a domain-name-system request for "www.playboy.com" with "192.168.0.255" instead. In this manner, an attempt by a web browser on the client system to access "www.playboy.com" may result in the web browser accessing a site at 192.168.0.255 (e.g., on the local network).

Filtering module 114 may redirect the client system to a variety of resources. For example, filtering module 114 may redirect the client system to a known safe and/or generic resource (e.g., "www.google.com"). Additionally or alternatively, filtering module 114 may redirect the client system to a site notifying a user of a policy violation. Such a site may outline organizational policies generally and/or may highlight a specific policy violated. The site may include an internal resource (e.g., on a local network) and/or an external resource (e.g., a site of a security vendor).

As explained above, by bundling filtering policies with domain-name-system requests, the systems and methods described herein may effectively filter Internet access. For example, by using a domain name server to apply various filtering policies, the systems and methods described herein may filter Internet access while minimizing the amount of necessary configuration to client systems and/or reducing outlays necessary for specialized equipment.

Figure 5:
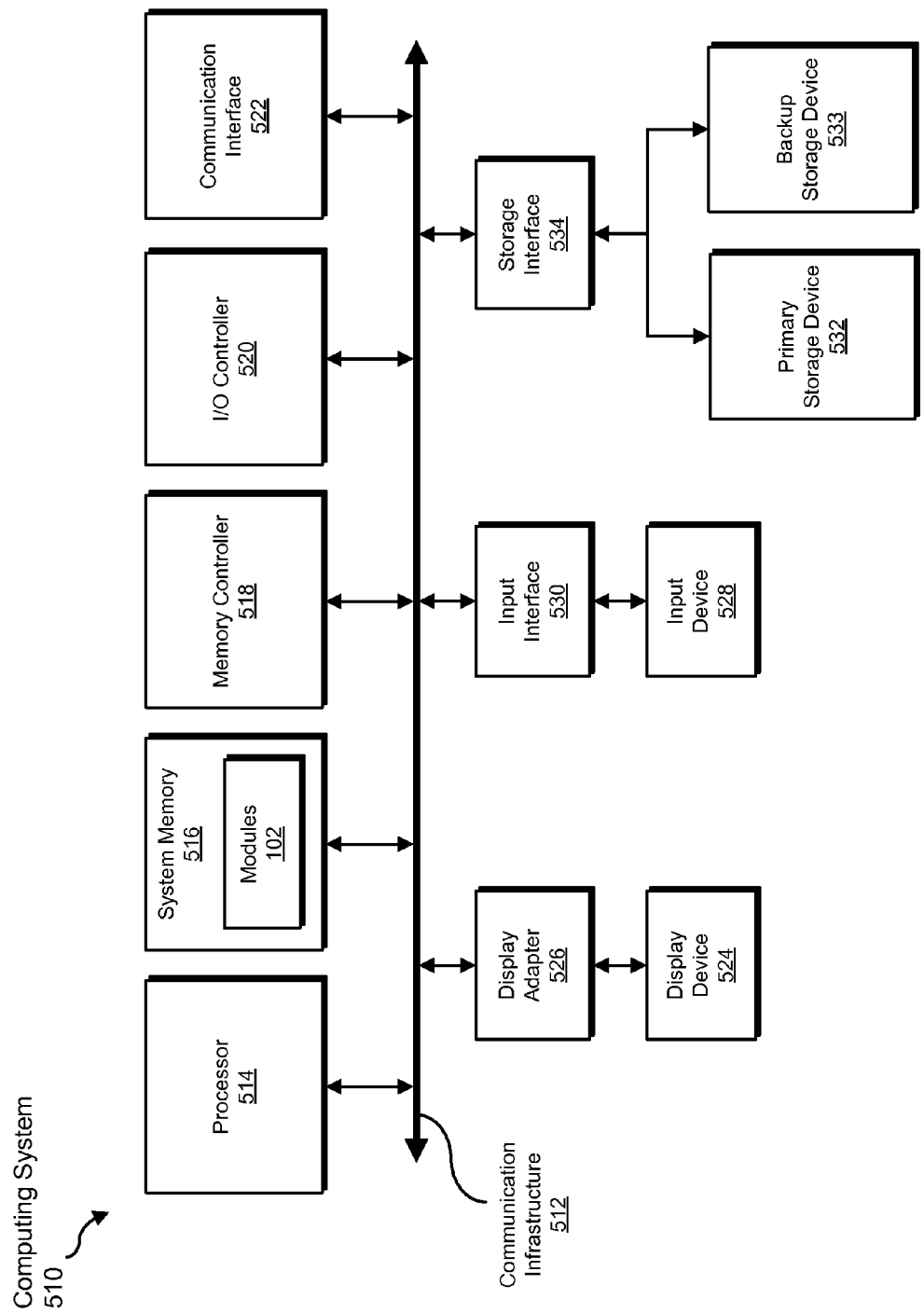
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of processing unit capable of processing data or interpreting and executing instructions. In certain embodiments, processor 514 may receive instructions from a software application or module. These instructions may cause processor 514 to perform the functions of one or more of the exemplary embodiments described and/or illustrated herein. For example, processor 514 may perform and/or be a means for performing, either alone or in combination with other elements, one or more of the identifying, intercepting, bundling, forwarding, receiving, looking up, including, determining, filtering, returning, and/or redirecting steps described herein. Processor 514 may also perform and/or be a means for performing any other steps, methods, or processes described and/or illustrated herein.

System memory 516 generally represents any type or form of volatile or non-volatile storage device or medium capable of storing data and/or other computer-readable instructions.

Examples of system memory 516 include, without limitation, random access memory (RAM), read only memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an input/output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an ISA, PCI, PCIe, or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512. In certain embodiments, memory controller 518 may perform and/or be a means for performing, either alone or in combination with other elements, one or more of the steps or features described and/or illustrated herein, such as identifying, intercepting, bundling, forwarding, receiving, looking up, including, determining, filtering, returning, and/or redirecting.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534. I/O controller 520 may be used, for example, to perform and/or be a means for performing, either alone or in combination with other elements, one or more of the identifying, intercepting, bundling, forwarding, receiving, looking up, including, determining, filtering, returning, and/or redirecting steps described herein. I/O controller 520 may also be used to perform and/or be a means for performing other steps and features set forth in the instant disclosure.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution. In certain embodiments, communication interface 522 may perform and/or be a means for performing, either alone or in combination with other elements, one or more of the identifying, intercepting, bundling, forwarding, receiving, looking up, including, determining, filtering, returning, and/or redirecting steps disclosed herein. Communication interface 522 may also be used to perform and/or be a means for performing other steps and features set forth in the instant disclosure.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device. In at least one embodiment, input device 528 may perform and/or be a means for performing, either alone or in combination with other elements, one or more of the identifying, intercepting, bundling, forwarding, receiving, looking up, including, determining, filtering, returning, and/or redirecting steps disclosed herein. Input device 528 may also be used to perform and/or be a means for performing other steps and features set forth in the instant disclosure.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a floppy disk drive, a magnetic tape drive, an optical disk drive, a flash drive, or the like. Storage interface 534 generally represents any type or form of interface or device for transferring data between storage devices 532 and 533 and other components of computing system 510.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

In certain embodiments, storage devices 532 and 533 may be used, for example, to perform and/or be a means for performing, either alone or in combination with other elements, one or more of the identifying, intercepting, bundling, forwarding, receiving, looking up, including, determining, filtering, returning, and/or redirecting steps disclosed herein. Storage devices 532 and 533 may also be used to perform and/or be a means for performing other steps and features set forth in the instant disclosure.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an application specific integrated circuit (ASIC) adapted to implement one or more of the exemplary embodiments disclosed herein.

Figure 6:
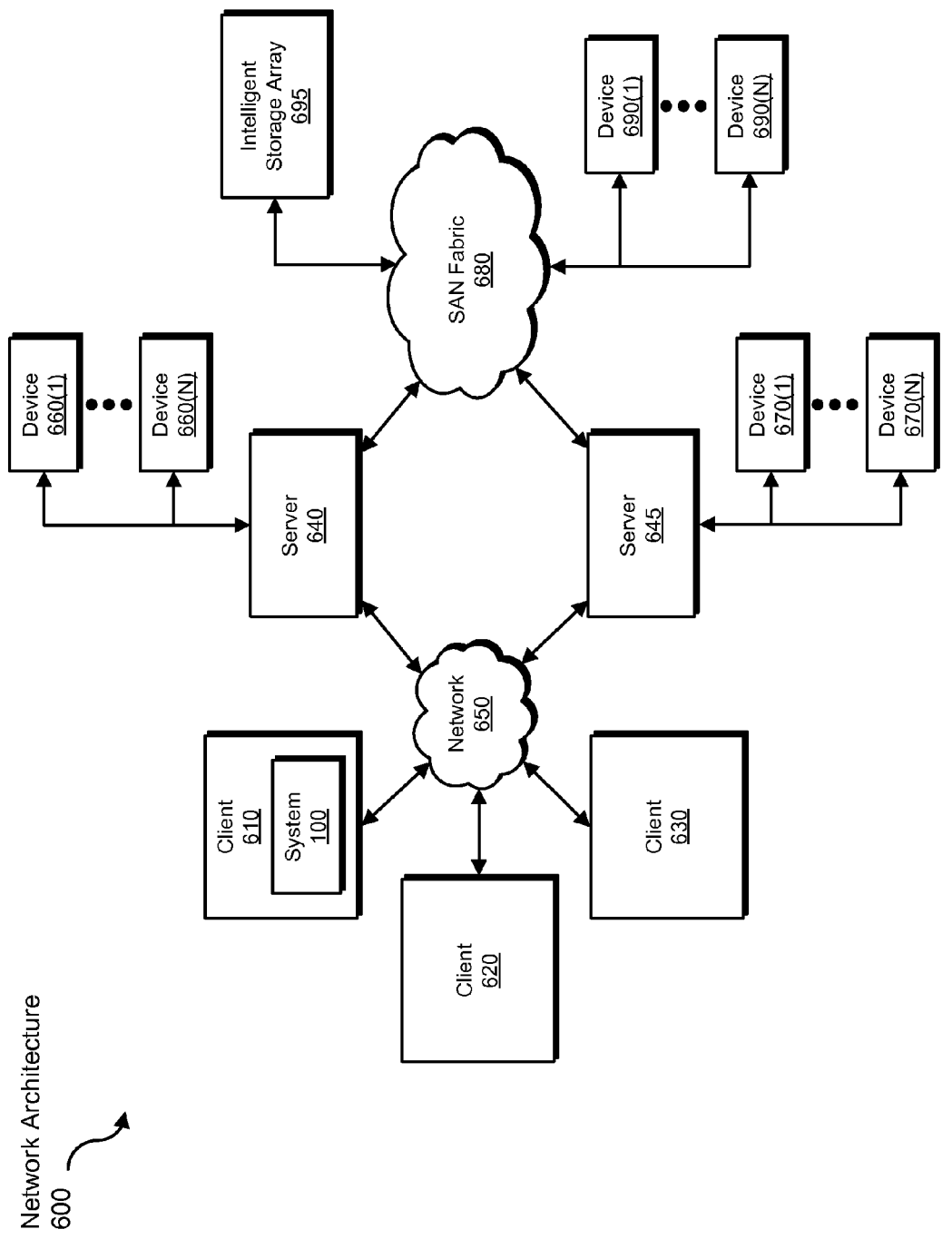
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. Client systems 610, 620, and 630 generally represent any type or form of computing device or system, such as exemplary computing system 510 in FIG. 5. In one example, client system 610 may include system 100 from FIG. 1.

Similarly, servers 640 and 645 generally represent computing devices or systems, such as application servers or database servers, configured to provide various database services and/or run certain software applications. Network 650 generally represents any telecommunication or computer network including, for example, an intranet, a wide area network (WAN), a local area network (LAN), a personal area network (PAN), or the Internet.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent network-attached storage (NAS) devices configured to communicate with servers 640 and 645 using various protocols, such as NFS, SMB, or CIFS.

Servers 640 and 645 may also be connected to a storage area network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650. Accordingly, network architecture 600 may perform and/or be a means for performing, either alone or in combination with other elements, one or more of the identifying, intercepting, bundling, forwarding, receiving, looking up, including, determining, filtering, returning, and/or redirecting steps disclosed herein.

Network architecture 600 may also be used to perform and/or be a means for performing other steps and features set forth in the instant disclosure.

As detailed above, computing system 510 and/or one or more components of network architecture 600 may perform and/or be a means for performing, either alone or in combination with other elements, one or more steps of an exemplary method for filtering Internet access.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules described herein may transform a domain-name-system server into a content-filtering device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for filtering Internet access, at least a portion of the method being performed by a computing device comprising at least one processor, the method comprising:
    intercepting a domain-name-system request from a client system;
    identifying a filtering policy for the client system, the filtering policy comprising filtering rules for filtering access to domains;
    bundling the filtering policy with the domain-name-system request by modifying the domain-name-system request to add the filtering policy to the domain-name-system request;
    forwarding the bundled domain-name-system request to a domain-name-system server, wherein the domain-name-system server is programmed to:
        identify the filtering policy that is bundled with the domain-name-system request;
        identify a domain that the domain-name-system request requests to resolve to an IP address;
    determine that the filtering policy applies to the domain;
    filter access to the domain based on the filtering rules included in the filtering policy.

2. The computer-implemented method of claim 1, wherein modifying the domain-name-system request comprises at least one of:
    appending the filtering policy to the domain-name-system request;
    prefixing the filtering policy to the domain-name-system request.

3. The computer-implemented method of claim 1, wherein modifying the domain-name-system request comprises adding the filtering policy to a field of the domain-name-system request.

4. The computer-implemented method of claim 3, wherein adding the filtering policy to the field of the domain-name-system request comprises:
    adding a delimiter to an end of a hostname in the domain-name-system request;
    adding data after the delimiter identifying the filtering policy.

5. The computer-implemented method of claim 4, wherein each bit in a bit string of the data added after the delimiter represents a different category of the filtering policy.

6. A non-transitory computer-readable-storage medium comprising one or more computer-executable instructions that, when executed by at least one processor of a computing device, cause the computing device to:
    intercept a domain-name-system request from a client system;
    identify a filtering policy for the client system, the filtering policy comprising filtering rules for filtering access to domains;
    bundle the filtering policy with the domain-name-system request by modifying the domain-name-system request to add the filtering policy to the domain-name-system request;
    forward the bundled domain-name-system request to a domain-name-system server, wherein the domain-name-system server is programmed to:
        identify the filtering policy that is bundled with the domain-name-system request;

identify a domain that the domain-name-system request requests to resolve to an IP address;
determine that the filtering policy applies to the domain;
filter access to the domain based on the filtering rules included in the filtering policy.

7. A system for filtering Internet access, the system comprising:
an identification module programmed to:
intercept a domain-name-system request from a client system;
identify a filtering policy for the client system, the filtering policy comprising filtering rules for filtering access to domains;
a bundling module programmed to bundle the filtering policy with the domain-name-system request by modifying the domain-name-system request to add the filtering policy to the domain-name-system request;
a forwarding module programmed to forward the bundled domain-name-system request to a domain-name-system server, wherein the domain-name-system server comprises:
a receiving module programmed to:
identify the filtering policy that is bundled with the domain-name-system request;
identify a domain that the domain-name-system request requests to resolve to an IP address;
a determination module programmed to determine that the filtering policy applies to the domain;
a filtering module programmed to filter access to the domain based on the filtering rules included in the filtering policy;
at least one processor configured to execute the identification module, the bundling module, the forwarding module, the receiving module, the determination module, and the filtering module.

8. The system of claim 7, wherein the bundling module modifies the domain-name-system request by at least one of:
appending the filtering policy to the domain-name-system request;
prefixing the filtering policy to the domain-name-system request.

9. The system of claim 7, wherein the bundling module modifies the domain-name-system request by adding the filtering policy to a field of the domain-name-system request.

10. The system of claim 9, wherein the bundling module adds the filtering policy to the field of the domain-name-system request by:
adding a delimiter to an end of a hostname in the domain-name-system request;
adding data after the delimiter identifying the filtering policy.

11. The system of claim 10, wherein each bit in a bit string of the data added after the delimiter represents a different category of the filtering policy.

12. The system of claim 7, wherein the identification module intercepts the domain-name-system request using a filter driver on the client system.

13. The system of claim 7, wherein the identification module intercepts the domain-name-system request by intercepting requests to an address of a domain-name-system server.

14. The system of claim 7, wherein the identification module intercepts the domain-name-system request using an intercepting appliance.

15. The system of claim 14, wherein the intercepting appliance comprises a router.

16. The computer-implemented method of claim 1, wherein intercepting the domain-name-system request comprises using a filter driver on the client system to intercept the domain-name-system request.

17. The computer-implemented method of claim 1, wherein intercepting the domain-name-system request comprises intercepting requests to an address of a domain-name-system server.

18. The computer-implemented method of claim 1, wherein intercepting the domain-name-system request comprises using an intercepting appliance to intercept the domain-name-system request.

19. The computer-implemented method of claim 18, wherein the intercepting appliance comprises a router.

20. The computer-implemented method of claim 1, wherein the filtering policy comprises a policy to filter Internet resources categorized as untrusted by a computing security vendor.

* * * * *